United States Patent [19]
Miyai et al.

[11] Patent Number: 4,807,220
[45] Date of Patent: Feb. 21, 1989

[54] OPTICALLY RECORDABLE CARRIER

[75] Inventors: Seiichi Miyai, Kanagawa; Junichi Akamatsu, Saitama, both of Japan

[73] Assignee: Sony Corp., Tokyo, Japan

[21] Appl. No.: 38,765

[22] Filed: Apr. 15, 1987

[30] Foreign Application Priority Data

Apr. 16, 1986 [JP] Japan ................................ 61-88944

[51] Int. Cl.$^4$ .............................................. G11B 3/70
[52] U.S. Cl. .................................... 369/286; 369/283
[58] Field of Search ........................ 369/283, 286, 284; 346/135.1, 137

[56] References Cited

U.S. PATENT DOCUMENTS

| 4,331,966 | 5/1982 | Moe | 369/284 X |
| 4,360,820 | 11/1982 | Forster et al. | 369/284 X |
| 4,443,806 | 4/1984 | Ando | 346/135.1 |
| 4,590,493 | 5/1986 | Inoue et al. | 346/135.1 |
| 4,710,418 | 12/1987 | Takano et al. | 346/135.1 X |

Primary Examiner—Stuart S. Levy
Assistant Examiner—Steven M. du Bois
Attorney, Agent, or Firm—Alvin Sinderbrand

[57] ABSTRACT

In an optically recordable carrier having a substrate and an optical record layer on the substrate, the optical record layer is enveloped, at all of its surfaces with a protective film of inorganic material by which the resistance to corrosion of the optical record layer is improved considerably.

13 Claims, 2 Drawing Sheets

4,807,220

OPTICALLY RECORDABLE CARRIER

BACKGROUND OF THE INVENTION

1. Field of the Invention

The present invention relates generally to optically recordable carriers and, more particularly, is directed to an optically recordable carrier having an optical record layer covered with a protective film.

2. Description of the Prior Art

An optically recordable medium particularly suited for use in a magneto-optical recording system is known in which a thin film of an alloy of rare earth metal and transition metal or the like is provided on a substrate. For example, amorphous films, such as, GdCo. GdFe, TbFe, DyFe, GdTbFe, TbDyFe and so on, have been proposed for use as optical record layers. In general, these known optically recordable media have poor corrosion resistance so that they are easily corroded in a humid atmosphere, and their characteristics as a record medium are deteriorated.

In order to prevent a metal layer on an optical disc from being corroded, it has been proposed by a person owing a duty to assign to the assignee of the present application, for example, as disclosed in U.S. patent application Ser. No. 06/693,303, filed Jan. 23, 1985, and which is a continuation application of Ser. No. 06/363,532, filed on Mar. 30, 1982, now abandoned, to omit the metal optical record layer from an outer edge portion and/or an inner edge portion of a substrate and to provide a protective film of organic material which extends over the metal optical record layer to the outer edge portion and/or the inner edge portion of the substrate. It is intended that the foregoing protective film of organic material will prevent the metal optical record layer from being exposed to the atmosphere and thus will prevent corrosion of the optical record layer.

However, even when the metal optical record layer is excluded from the outer edge portion and/or inner edge portion of the substrate and the metal optical record layer is covered with a protective film of organic material, such protective film of organic material cannot completely seal out water vapor and oxygen. There is still the risk that water vapor and oxygen in the atmosphere will be diffused through the protective film of organic material and reach the metal optical record layer. Thus, complete protection of the optical record layer from corrosion cannot be attained. Corrosion of the optical record layer is, of course, a particularly serious problem in the case of optically recordable carriers which are employed in magneto-optical recording and reproducing systems of the type in which recording, reproduction and erasure are carried out repeatedly.

OBJECTS AND SUMMARY OF THE INVENTION

Accordingly, it is an object of this invention to provide an optically recordable carrier which is free of the above mentioned defects.

It is another object of this invention to provide an optically recordable carrier in which an optical record layer is covered with a protective film of inorganic material by which corrosion of the optical record layer is prevented.

According to one aspect of the present invention, there is provided an optically recordable carrier, comprising a substrate, an optical record layer on said substrate, and a protective film of inorganic material enveloping the optical record layer at all surfaces of the latter.

The above, and other objects, features and advantages of the present invention, will become apparent from the following detailed description of preferred embodiments to be read in conjunction with the accompanying drawings, in which like reference numerals identify corresponding elements and parts in the several views.

DESCRIPTION OF THE PREFERRED EMBODIMENTS

Figure 1:
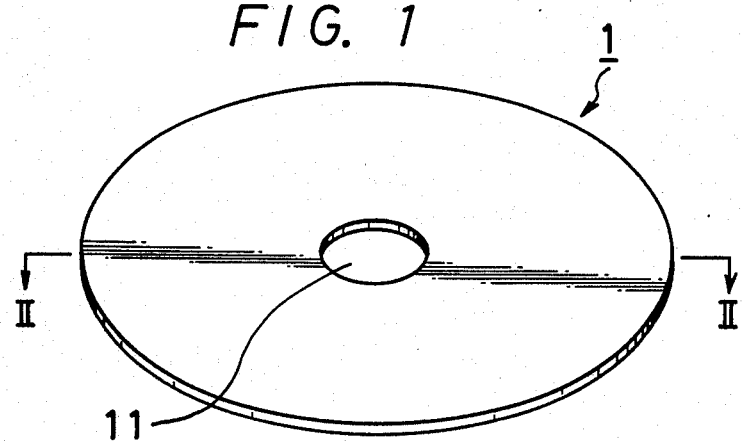
FIG. 1 is a perspective view of an optically recordable carrier according to a first embodiment of the present invention.

The present invention will now be described in detail with reference to the drawings, and initially with reference to FIGS. 1 and 2, in which an optically recordable carrier 1 according to an embodiment of this invention is shown to have an annular or ring-shaped substrate 2 with a circular opening 11 concentric therewith. The substrate 2 is made of glass, polycarbonate resin or other suitable materials.

The substrate 2 has formed thereon a first protective layer 3 of inorganic material, such as, silicon nitride, aluminum nitride or the like. The layer 3 is formed on substrate 2 by sputtering or some other suitable process. The radial distance from the center of opening 11 to the outer peripheral edge 3a of protective layer 3 is smaller than the similar radial distance to the outer peripheral edge 2a of substrate 2, and the radial distance from the center of opening 11 to the inner peripheral edge 3b of layer 3 is longer than the similar radial distance to the inner peripheral edge 2b of substrate 2.

An optical record layer 4 is formed on the first protective layer 3 of inorganic material. The optical record layer 4 is a layer of film of an alloy already known for such purpose, for example, an alloy of rare earth metal and transition metal, and is grown on film 3 by sputtering or some other suitable process. The optical record layer 4 is coextensive with layer 3, that is, the radial distances from the center of opening 11 to its outer and inner peripheral edges 4a and 4b are the same as the corresponding radial distances for the first protective layer 3, and hence the optical record layer 4 is precisely superposed on the first protective layer 3.

A second protective layer 5 is of an inorganic material the same as that forming the first protective layer 3. The second protective layer 5 is formed by sputtering or other suitable process so that it covers the upper surface of optical record layer 4 and also the surfaces of the outer peripheral edges 3a and 4a of first protective layer 3 of inorganic material and optical record layer 4 and the surfaces of the inner peripheral edges 3b and 4b of layers 3 and 4. The radial distance from the center of opening 11 to the outer peripheral edge surface 5a of protective layer 5 of inorganic material is larger than the radial distance from the center of opening 11 to the outer peripheral edges 3a and 4a of layers 3 and 4. Further, the radial distance from the center of opening 11 to the inner peripheral edge surface 5b of layer 5 is smaller than the radial distance from the center of opening 11 to the inner peripheral edges 3b and 4b of the first protective layer 3 and the optical record layer 4. Furthermore, the outer diameter of second protective layer 5 is selected to be smaller than the outer diameter of substrate 2 and the inner diameter of second protective layer 5 is larger than the inner diameter of substrate 2.

It will be apparent that the first and second protective layers 3 and 5 are joined or fused at the outer and inner peripheral edges 3a and 3b of layer 3 so as to form a continuous film of inorganic material enveloping the optical record layer 4.

A protective film 6 of organic material covers the outside of the second protective layer 5 of inorganic material. The protective film 6 is formed of a synthetic resin, for example, of ultraviolet ray hardening-type, which is coated on the second protective layer 5 and then cured by irradiation with ultraviolet rays. The outer peripheral edge surface 6a and the inner peripheral edge surface 6b of protective film 6 of organic material substantially coincide with the outer peripheral edge 2a and the inner peripheral edge 2b, respectively, of substrate 2.

In the above-described optically recordable carrier 1, optical record layer 4 is enveloped by the first and second protective layers 3 and 5 of inorganic material which perfectly protect the optical record layer 4 from the water vapor and the oxygen in the atmosphere, thereby improving the resistance to corrosion of the optical record layer 4.

Figure 3:
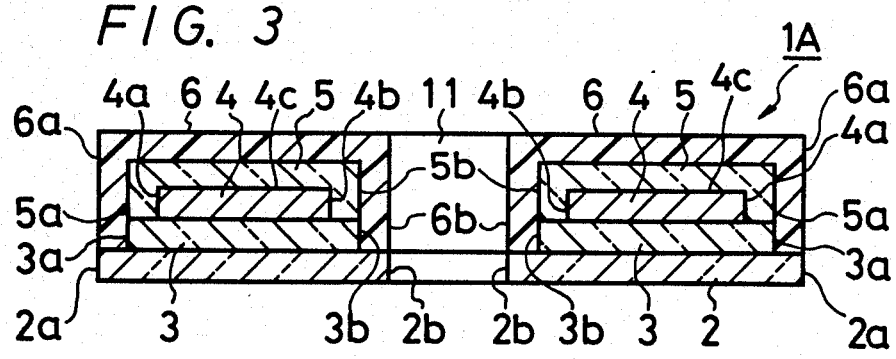
FIGS. 3, 4 and 5 are diagrammatic cross-sectional views similar to that of FIG. 2, but showing other respective embodiments of the present invention.

Referring now to FIG. 3, it will be seen that, in an optically recordable carrier 1A according to a second embodiment of the invention, the outer diameter of the optical record layer 4 formed on the first protective layer 3 is smaller than the outer diameter of the first protective layer 3 and the inner diameter of the optical record layer 4 is larger than the inner diameter of the first protective layer 3. Accordingly, the outer peripheral edge 4a and the inner peripheral edge 4b of optical record layer 4 are radially spaced from the outer peripheral edge 3a and the inner peripheral edge 3b of the first protective layer 3 of inorganic material.

The second protective layer 5 of inorganic material has outer and inner diameters that are the same as those of the first protective layer 3 so that layer 5 covers the upper surface 4c and the inner and outer peripheral edge surfaces 4b and 4a of the optical record layer 4 in optically recordable carrier 1A. The lower edge of second protective layer 5 near its inner and outer edge surfaces 5b and 5b is joined or fused to the upper surface of the lower first protective layer 3 of inorganic material near the inner and outer edges 3b and 3a, respectively, of layer 3 so as to again form a continuous film of inorganic material in which optical record layer 4 is enveloped. Then, a protective film 6 of organic material is formed over the protective inorganic film as described before in relation to the optically recordable carrier 1.

Figure 2:
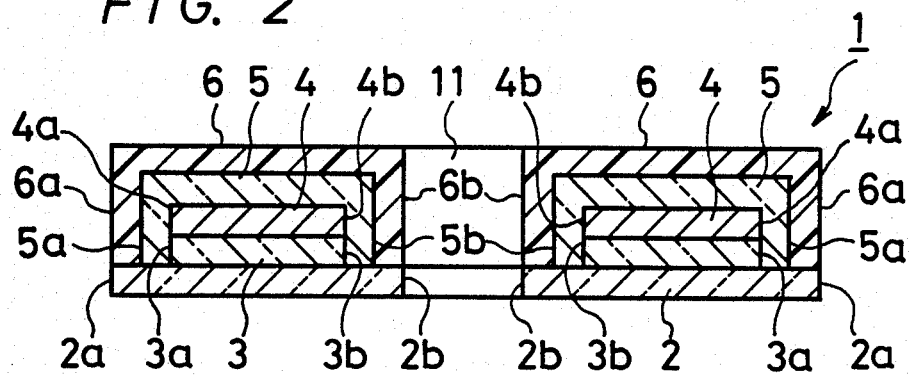
FIG. 2 is a diagrammatic cross-sectional view taken along a line II—II in FIG. 1, and showing each layer with its thickness exaggerated or on an overly large scale.

Experiments conducted by the inventors of the present invention, have proven that the optically recordable carrier 1A of FIG. 3 is superior in corrosion resistance to the optically recordable carrier 1 of FIG. 2. The reason for this may be that, when the second protective layer 5 of inorganic material is formed by sputtering in the embodiment of FIG. 2, it is difficult to provide different deposition rates at the peripheral edge portions and at the central portion, respectively, of the second protective layer 5. Therefore, even when a predetermined thickness of the second protective layer 5, which corresponds to the thickness of the first protective layer 3 of inorganic material and to the thickness of the optical record layer 4, is deposited on the upper surface 4c of layer 4, that same thickness of layer 5 is not obtained at its portions around the inner and outer peripheral edges 4b and 4a of optical record layer 4. As a result, in the optically recordable carrier 1, the second protective layer 5 of inorganic material is too thin at its portions corresponding to the inner and outer peripheral edges 4b and 4a of the optical record layer 4. On the other hand, in the optically recordable carrier 1A, the film thickness of the second protective layer 5 at its portions confronting the inner and outer peripheral edges 4b and 4a of optical record layer 4 need only be the sum of the film thickness of optical record layer 4 and the thickness of the second protective layer 5 so that a sufficient thickness of layer 5 can be obtained at such portions.

Figure 4:
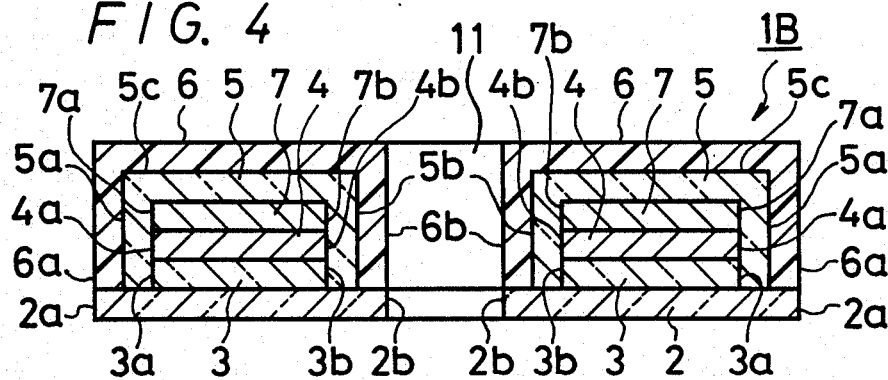

Referring now to FIG. 4, it will be seen that, in an optically recordable carrier 1B according to a third embodiment of the present invention, a reflective film 7 is formed on the optical record layer 4. This reflective film 7 may be formed by vacuum evaporation of aluminum or the like, and is coextensive with the optical record layer 4 which, as in FIG. 2, is coextensive with the first protective layer 3 so that the reflective film 7 is precisely superposed upon optical record layer 4. The second protective layer 5 of inorganic material is formed so as to cover the upper surface of reflective film 7 and also the outer peripheral edges 3a, 4a, 7a and the inner peripheral edges 3a, 4b and 7b of first protective layer 3, optical record layer 4 and reflective film 7, respectively.

In the optically recordable carrier 1B, since the optical record layer 4 is sandwiched by the first protective layer 3 of inorganic material and the reflective film 7, the resistance to corrosion of the optical record layer 4 is further improved. In the case of carrier 1B, protective film 6 of organic material is formed so as to cover the upper surface 5c and the inner and outer peripheral surfaces 5b and 5a of the second protective layer 5.

Figure 5:
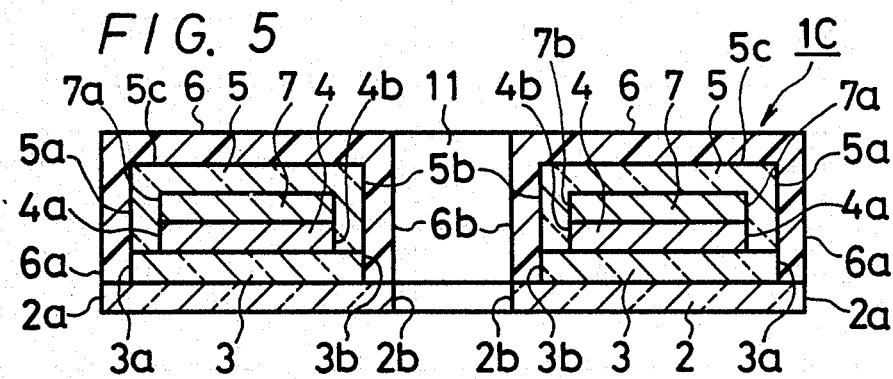

Referring now to FIG. 5, it will be seen that, in an optically recordable carrier 1C according to a fourth embodiment of the present invention, a reflective film 7 is formed on an optical record layer 4 so as to be coextensive with the latter, and the optical record layer 4 has its outer and inner peripheral edges 4a and 4b spaced from the corresponding edges 3a and 3b of the first protective layer 3, as in the embodiment of FIG. 3.

In the embodiment of FIG. 5, the second protective layer 5 of inorganic material may have its deposited thickness increased by an amount corresponding to the sum of the thicknesses of the optical record layer 4 and the reflective film 7 at its portions outside and inside the optical record layer 4. Such increased thickness is less, by the thickness of the protective layer 3, than the increase in thickness of layer 5 required in the embodiment of FIG. 4. Therefore, for the reason given in the comparison of the first and second embodiments shown in FIGS. 2 and 3, the fourth embodiment of FIG. 5 is superior to the third embodiment of FIG. 4 in respect to its corrosion resistance.

Corrosion tests were carried out with respect to the optically recordable carriers 1, 1A, 1B and 1C according to the first, second, third and fourth embodiments of the present invention. The test results shown in the table below indicate that all of such embodiments are excellent in corrosion resistance, as compared with comparative examples 1 and 2 which will be described later with reference to FIGS. 6 and 7, respectively.

In each of the corrosion tests, the several layers and films are formed on a respective annular polycarbonate resin substrate with an outer diameter of 130 mm and with an inner diameter of 15 mm. The radial distance between the inner peripheral edges 2b and 4b of the substrate 2 and the optical record layer 4, respectively, and the radial distance between the outer peripheral edges 2a and 4a of the substrate 2 and the optical record layer 4 were about 3 mm, respectively, the thickness of that portion of the second protective layer 5 of inorganic material covering inner and outer peripheral edge portions of underlying layers was about 2 mm in the radial direction, and the thickness of the protective film 6 of organic material was about 1 mm.

Figure 6:
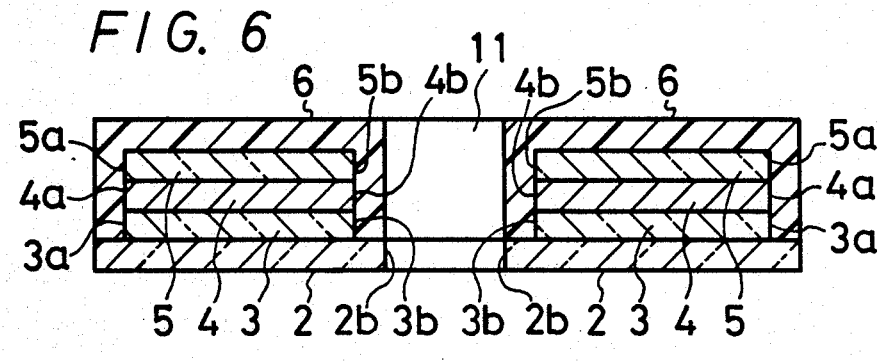
FIGS. 6 and 7 are diagrammatic cross-sectional views also similar to that of FIG. 2, but showing respective optically recordable carriers to which reference will be made as comparative examples.

In the comparative example 1 shown in FIG. 6, a protective layer 3 of inorganic material with an outer diameter of about 127 mm and with an inner diameter of about 22 mm was formed on an annular-shaped substrate 2 with an outer diameter of 130 mm and with an inner diameter of 15 mm. The optical record layer 4 was formed on the protective layer 3 of inorganic material so as to coincide with the latter in shape and in size, and the second protective layer 5 of inorganic material is superposed on layer 4 so as to coincide therewith. Then, a protective film 6 made of organic material covers the upper surface of protective layer 5 and the inner peripheral surfaces 3b, 4b, 5b and the outer peripheral surfaces 3a, 4a and 5a of the layers 3, 4 and 5, respectively.

Figure 7:
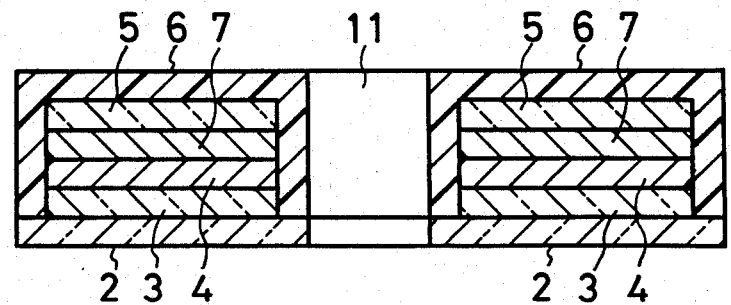

The comparative example 2 shown in FIG. 7 is generally similar to the comparative example 1, and further includes a reflective film 7 formed coextensively between the optical record layer 4 and the protective layer 5 of inorganic material. It will be seen that, in the comparative examples 1 and 2, the protective layers 3 and 5 of inorganic material are not joined or fused together at their inner and outer peripheral edges and, therefore, do not envelope the optical record layer. It will be appreciated that, in each of the optically recordable carriers 1, 1A, 1B and 1C embodying the invention and in each of the comparative examples 1 and 2, the various layers and films are formed of the same materials as were mentioned for layers and films, respectively, identified by the same reference numerals in the description of the first embodiment shown on FIG. 1.

In the corrosion tests, the various embodiments of the invention and the comparative examples formed as described above were left in the atmosphere at a temperature of 80° C. and a humidity of 90% for 500 hours.

TABLE

| Samples | Results of Corrosion Test |
| --- | --- |
| First Embodiment (FIG. 2) | Not corroded |
| Second Embodiment (FIG. 3) | Not corroded |
| Third Embodiment (FIG. 4) | Not corroded |
| Fourth Embodiment (FIG. 5) | Not corroded |
| Comparative Example 1 (FIG. 6) | Corroded considerably at inner and outer edge portions of optical record layer 4 and the maximum corroded distance was 15 mm measured radially from the outer and inner peripheral edges 4a and 4b. |
| Comparative Example 2 (FIG. 7) | Corroded considerably at inner and outer edge portions of optical record layer 4 and the maximum corroded distance was 10 mm measured radially from the outer and inner peripheral edges 4a and 4b. |

As will be clear from the above table, the optically recordable carriers embodying the invention all exhibit excellent corrosion-resistance properties. Such excellent corrosion resistance is not realized if the layers 3 and 5 of inorganic material do not fully envelope the optical record layer 4, as in comparative examples 1 and 2. In such case, the outer and inner peripheral edges 4a and 4b of optical record layer 4 are only covered by the protective film 6 of organic material through which water vapor and oxygen can diffuse into contact with the optical record layer 4. If the optical record layer 4 is covered only by the protective layers 3 and 5 of inorganic material, the optically recordable carrier is fragile. Therefore, the protective film 6 of organic material is provided. Accordingly, even if an optically recordable carrier embodying the invention is dropped on the floor, or otherwise subjected to impacts, protective film 6 of organic material acts as a so-called shock absorber to prevent the optically recordable carrier from being damaged.

Although specific preferred embodiments of the invention have been described above with reference to the accompanying drawings, it will be apparent that the invention is not limited to those precise embodiments, and that many modifications and variations could be effected therein by one skilled in the art without departing from the spirit or scope of the invention as defined in the appended claims.

What is claimed is:

1. An optically recordable carrier, comprising a substrate, an optical record layer on said substrate, and a protective film of inorganic material interposed between said optical record layer and said substrate and further enveloping all surfaces of said optical record layer, wherein said optical record layer and said substrate are of annular shape, and said protective film of inorganic material includes a first protective layer interposed between said substrate and said optical record layer and a second protective layer of the same inorganic material as said first protective layer and being formed so as to cover an upper surface and inner and outer peripheral edge surfaces of said optical record layer and to fuse with said first protective layer.

2. An optically recordable carrier according to claim 1; in which said inorganic material of the protective film is a nitride.

3. An optically recordable carrier according to claim 2; in which said nitride is selected from among silicon nitride and aluminum nitride.

4. An optically recordable carrier according to claim 1; in which said second protective layer is covered on its outer surface with a protective film of organic material.

5. An optically recordable carrier according to claim 1; in which said first protective layer is also of annular shape and has an inner diameter larger than that of said substrate, an outer diameter of said first protective layer is smaller than that of said substrate, said optical record layer is coextensive with said first protective layer, and said second protective layer is formed so as to extend over and fuse with inner and outer edge surfaces of said first protective layer in addition to covering said upper surface and inner and outer peripheral edge surfaces of said optical record layer.

6. An optically recordable carrier according to claim 5; in which said second protective layer is annular and has an inner diameter larger than that of said substrate, an outer diameter of said second protective layer is smaller than that of said substrate and said second protective layer is covered on its upper surface and inner and outer peripheral surfaces with a protective film of organic material having inner and outer diameters the same as those of said substrate.

7. An optically recordable carrier according to claim 1; in which said first protective layer is also of annular shape and has an inner diameter larger than that of said substrate, an outer diameter of said first protective layer is smaller than that of said substrate, an inner diameter of said optical record layer formed on said first protective layer is larger than that of said first protective layer and an outer diameter of said optical record layer is smaller than that of said first protective layer, and the latter is formed so as to cover an upper surface and inner and outer peripheral edge surfaces of said optical record layer.

8. An optically recordable carrier according to claim 7, in which said second protective layer has inner and outer diameters which are the same as those of said first protective layer and said second protective layer is covered at its upper surface and inner and outer peripheral edge surfaces with a protective film of organic material having inner and outer diameters the same as those of said substrate.

9. An optically recordable carrier according to claim 1; in which an annular-shaped reflective film is interposed between said optical record layer and said second protective layer.

10. An optically recordable carrier according to claim 9; in which said first protective layer, said optical record layer and said reflective film are coextensive with each other and have inner diameters which are larger than the inner diameter of said substrate, said first protective layer, said optical record layer and said reflective film have outer diameters which are smaller than the outer diameter of said substrate, and said second protective layer covers the upper surface of said reflective film and inner and outer peripheral edge surfaces of said reflective film, said optical record layer and said first protective layer.

11. An optically recordable carrier according to claim 10; in which an inner diameter of said second protective layer is larger than that of said substrate, an outer diameter of said second protective layer is smaller than that of said substrate, and said second protective layer is covered, at its upper surface and inner and outer peripheral edge surfaces, with a protective film of organic material having inner and outer diameters the same as those of said substrate.

12. An optically recordable carrier according to claim 9; in which an inner diameter of said first protective layer is larger than that of said substrate, an outer diameter of said first protective layer is smaller than that of said substrate, inner diameters of said optical record layer and said reflective film are larger than that of said first protective layer, outer diameters of said optical record layer and said reflective film are smaller than that of said first protective layer, and said second protective layer covers an upper surface of said reflective film and inner and outer peripheral edge surfaces of said reflective film and said optical record layer.

13. An optically recordable carrier according to claim 12; in which inner and outer diameters of said second protective layer are the same as those of said first protective layer, and said second protective layer is covered, at its upper surface and inner and outer peripheral edge surfaces, with a protective film of organic material having inner and outer diameters the same as those of said substrate.

* * * * *